N. A. WEARE.
MIRROR ADJUSTER.
APPLICATION FILED AUG. 1, 1917.
1,260,106.
Patented Mar. 19, 1918.
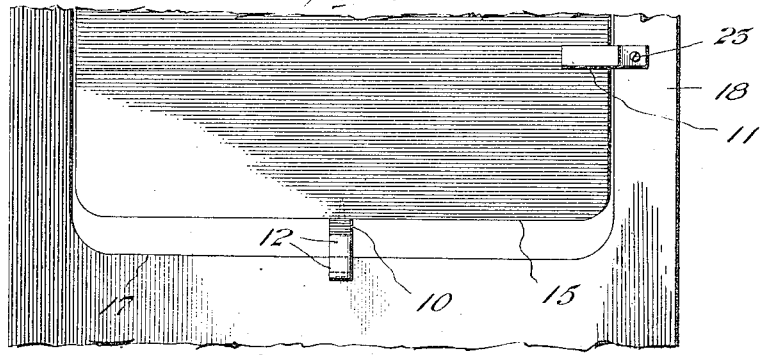
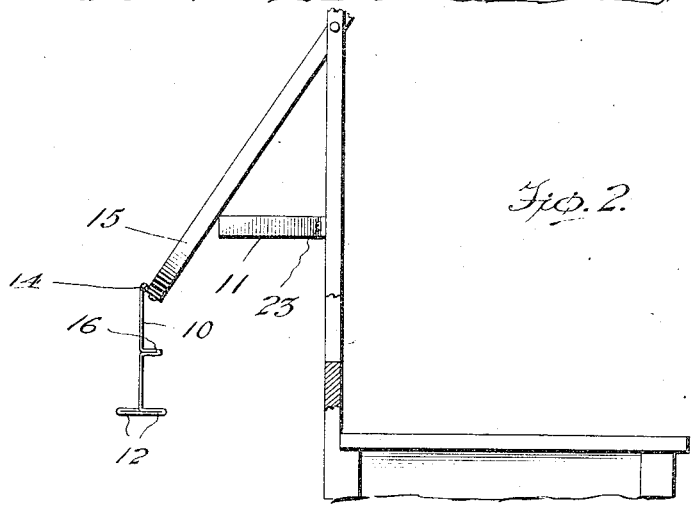
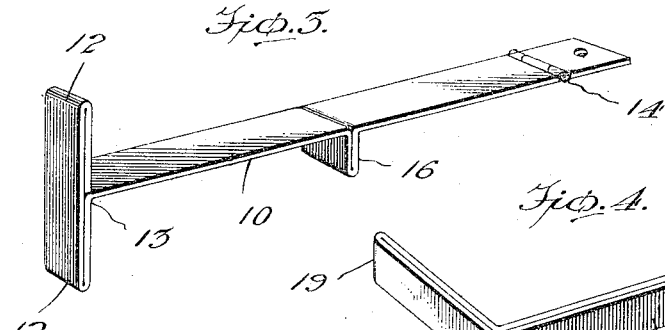
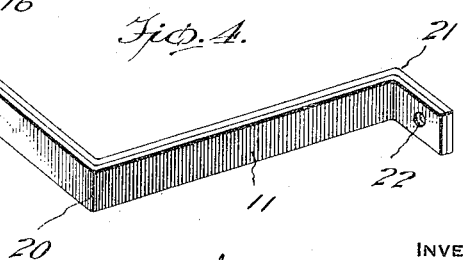
WITNESSES
INVENTOR
Nettie A. Weare
BY Victor J. Evans
ATTORNEY

UNITED STATES PATENT OFFICE.

NETTIE A. WEARE, OF LOWELL, ARIZONA.

MIRROR-ADJUSTER.

1,260,106.  Specification of Letters Patent.  Patented Mar. 19, 1918.

Application filed August 1, 1917. Serial No. 183,910.

*To all whom it may concern:*

Be it known that I, NETTIE A. WEARE, a native-born citizen of the United States, residing at Lowell, in the county of Cochise and State of Arizona, have invented new and useful Improvements in Mirror-Adjusters, of which the following is a specification.

This invention relates to improvements in mirror adjusting devices.

An object of the present invention is to provide a device which may be secured to a pivotally mounted mirror, which is usually found on bureaus or dressing tables, by means of which the mirror may be quickly and easily adjusted for the convenience of the user and retained in such adjusted position.

Another object of the invention is to provide a device which may be manufactured and sold at a nominal cost, the simplicity of the device being such as not to require the services of a skilled workman for its attachment.

The invention therefore consists of the following novel combination and arrangement of parts, hereinafter more fully described and illustrated in the accompanying drawings, in which—

Figure 1 is a rear elevation of a portion of a bureau with the invention applied thereto;

Fig. 2 is a fragmentary view of one end of the mirror and its support, the said mirror being shown tilted at an angle the reverse of that shown in Fig. 1;

Fig. 3 is a detailed perspective view of a bottom member of the adjusting device; and Fig. 4 is a similar view of the side member.

Referring to the drawings in detail, similar characters of reference denote corresponding parts throughout the several views.

In the drawings, there is illustrated a fragmentary portion of a bureau to which the invention is applied, the said invention including a bottom member 10 and a side member 11. The bottom member is formed of a single strip of flexible or spring metal, which is bent as at 13 to provide oppositely extending offset lugs 12, which may be either used as adjusting lugs or as a handle for the manipulation of the device.

The device is secured to the bottom edge of the mirror 15 by means of a hinge 14 as stated, the said device extending rearward and being positioned behind the mirror. In order to hold the mirror with the bottom edge tilted forward, so that it may be conveniently used by a tall person, the device is swung upward so that the lug 16 will clear the ledge 17 provided upon the bureau, the said lug being positioned in front of this ledge to hold the mirror in its adjusted position. If it is desired to further tilt the mirror, one of the lugs 12 may be used for this purpose.

In order to tilt and hold the mirror in a reverse position, there is secured to the side frame of the mirror support 18 the member 11. This member is composed of a strip of flexible or spring metal, bent into Z-shape, by first bending the strip upon itself as at 19. After the strip has been doubled it is further bent as shown at 20 and 21, the portion beyond the last mentioned bend being provided with registering openings 22 for the passage of the screw or other fastening device 23, by means of which the member is secured to the support 18. When it is desired to adjust the mirror in the opposite direction, the lug 16 is removed from the position in front of the ledge 17, the mirror being swung with its lower edge backward, and the member 11 flexed to permit the said mirror to pass. The mirror is then allowed to rest against that portion of the member included between the bends 19 and 20, the said mirror then being in a position to reflect the lower limbs of a person.

It is believed that from the foregoing description, when taken in connection with the accompanying drawings, that the construction, operation and advantages of the invention will be apparent. The right is reserved to make such changes in the form and proportion thereof as will fall within the scope of the claims hereto appended.

Having described the invention, what is claimed is:

1. The combination with a pivotally supported mirror, of means for adjusting the mirror at an angle with respect to its support, said means including a flexible element secured to the bottom of the mirror and adjustable against the support for tilting the mirror in one direction and a flexible element carried by the support for contact with said mirror for tilting the mirror in an opposite direction.

2. The combination with a pivotally supported mirror, of means for adjusting the mirror at an angle with respect to its support, said means including a laterally extending flexible element carried by the mirror, offset adjusting lugs formed on said element, said lugs being adapted to engage the support to hold the mirror tilted in one direction and a flexible element carried by the support for contact with said mirror for tilting the mirror in an opposite direction.

3. The combination with a pivotally supported mirror, of means for adjusting the mirror at an angle with respect to its support, said means including a flexible element secured to the bottom of the mirror and adjustable against the support for tilting the mirror in one direction and a Z-shaped flexible element secured to the support for contact with the mirror for holding the mirror tilted in an opposite direction.

In testimony whereof I affix my signature.

NETTIE A. WEARE.

Copies of this patent may be obtained for five cents each, by addressing the "Commissioner of Patents, Washington, D. C."